April 24, 1951   J. B. NORMINGTON   2,549,985
LAMINATED SHOE UPPER
Filed May 20, 1946   4 Sheets-Sheet 1
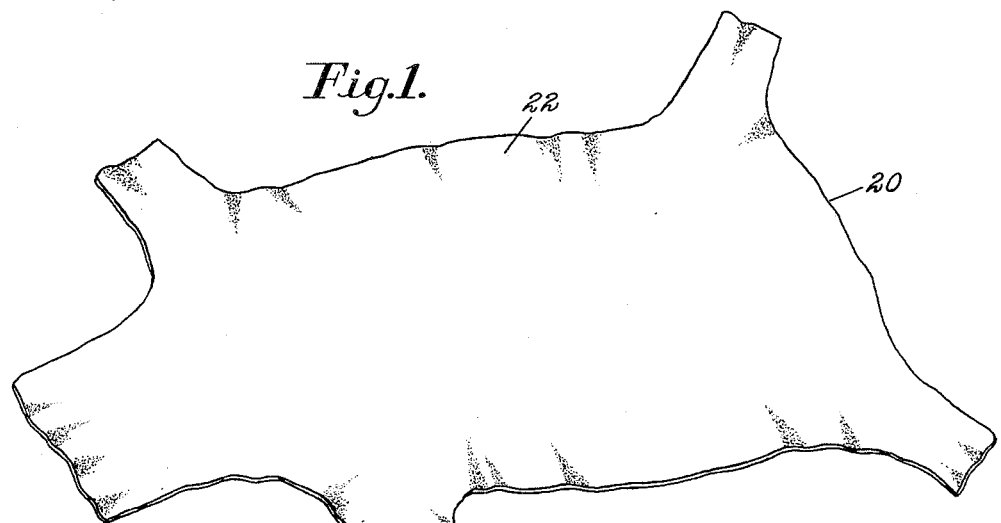
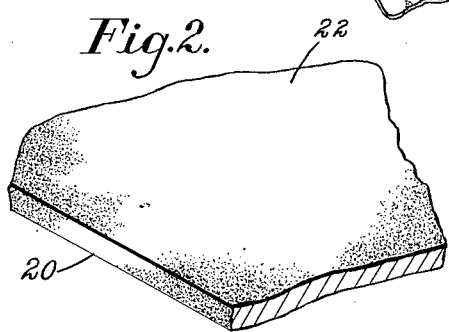
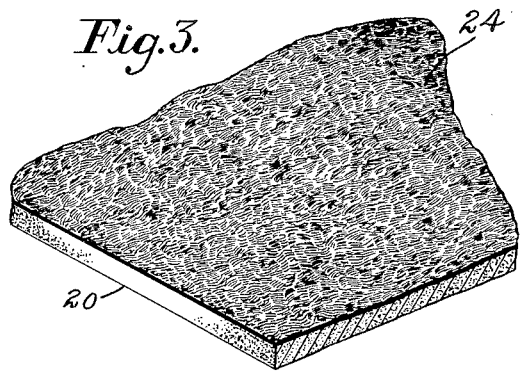
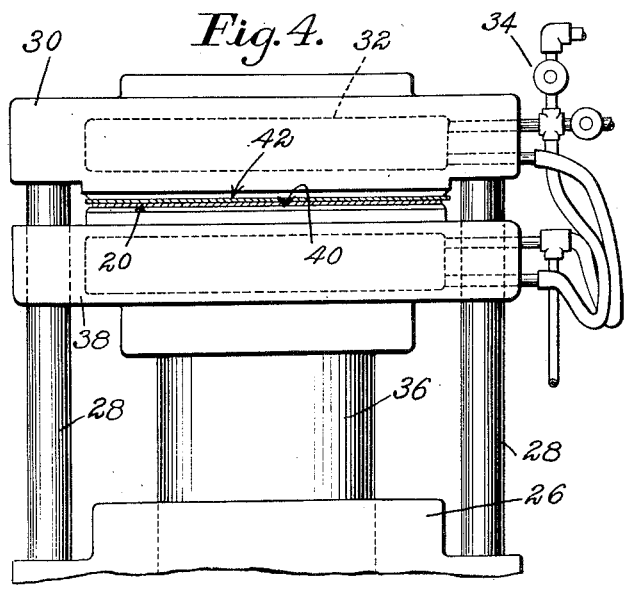
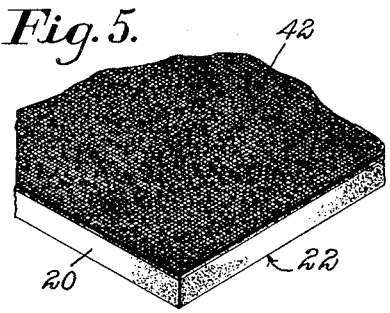
*Inventor:*
James B. Normington
By his Attorney

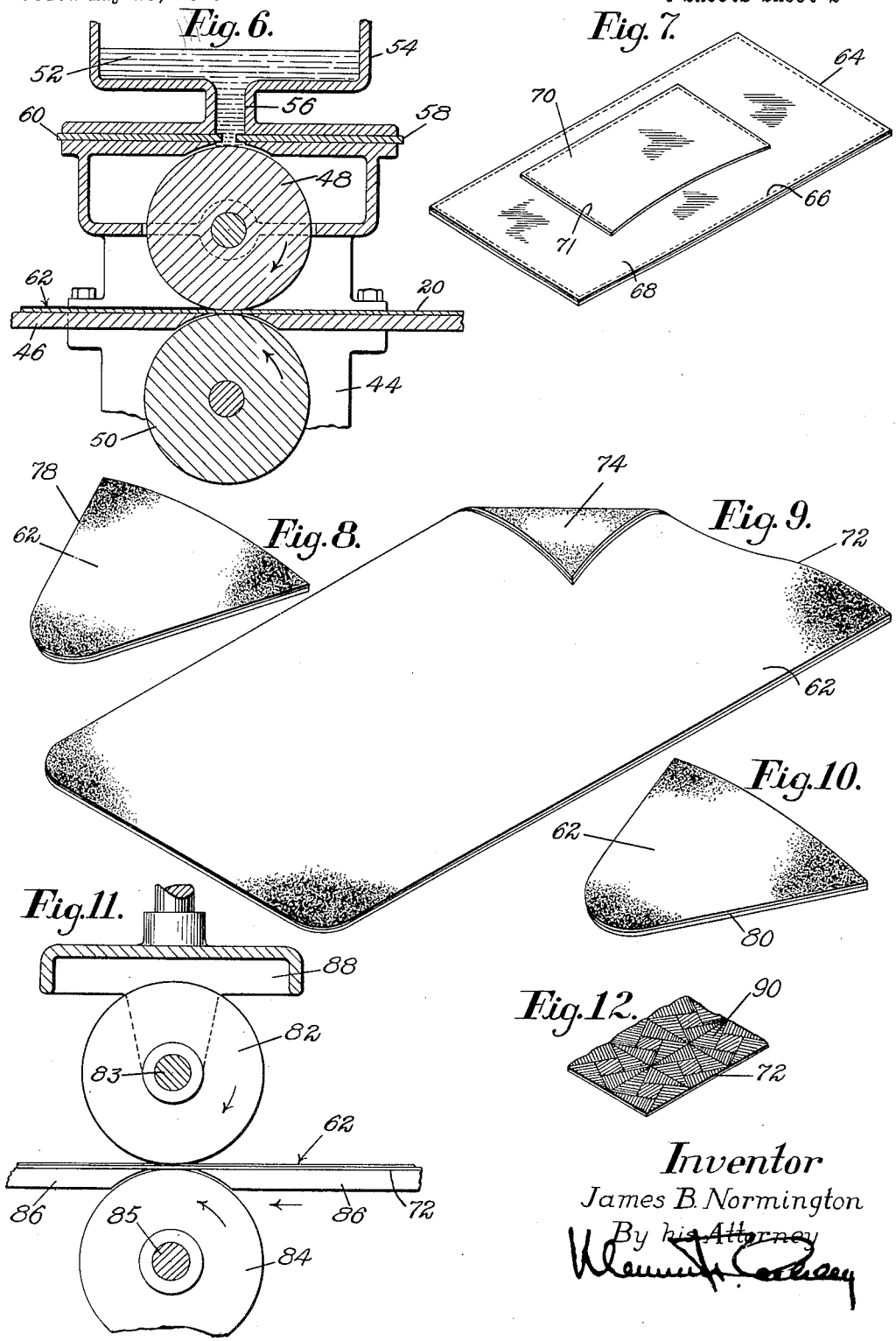

April 24, 1951   J. B. NORMINGTON   2,549,985
LAMINATED SHOE UPPER
Filed May 20, 1946   4 Sheets-Sheet 3
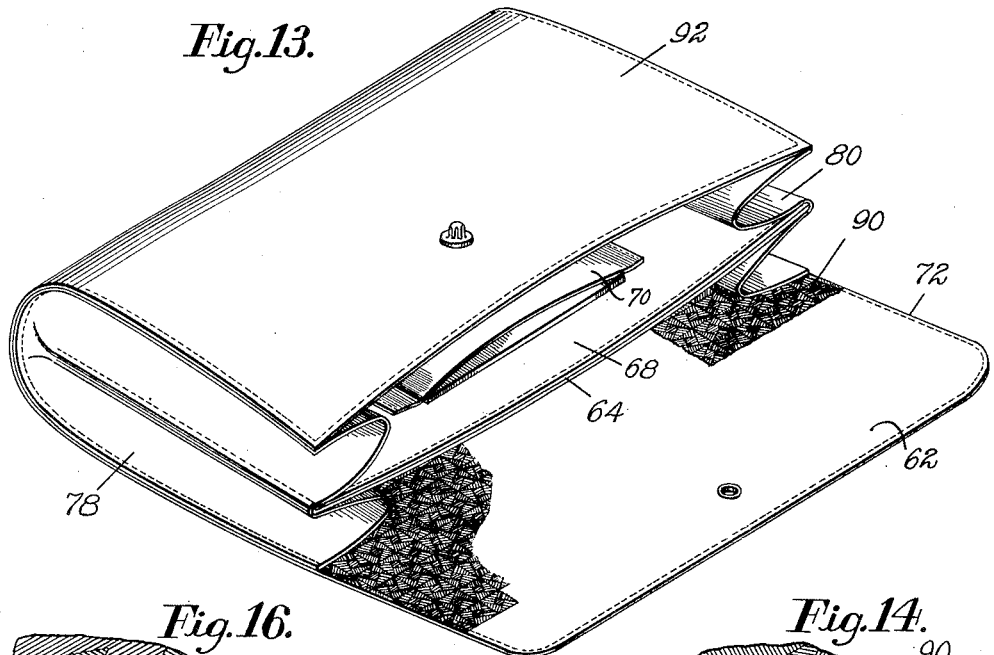
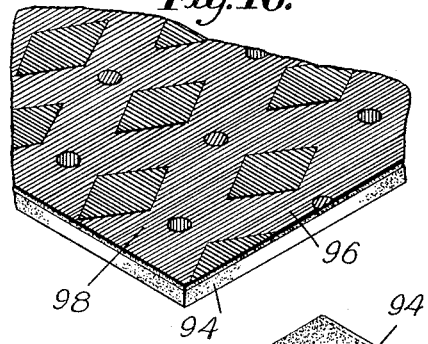
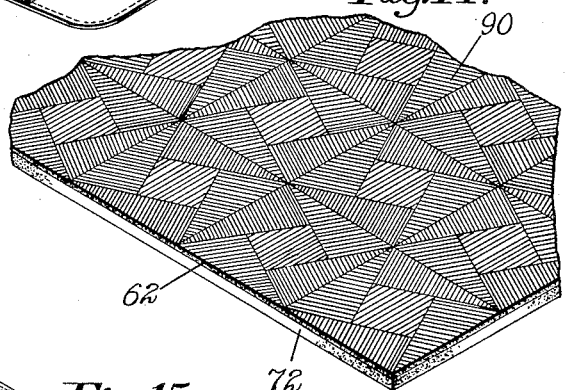
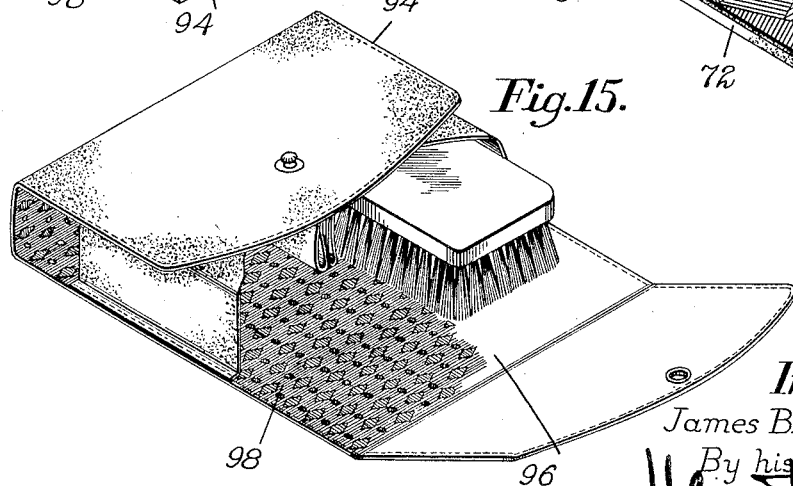
Inventor:
James B. Normington
By his Attorney April 24, 1951  J. B. NORMINGTON  2,549,985
LAMINATED SHOE UPPER
Filed May 20, 1946  4 Sheets-Sheet 4
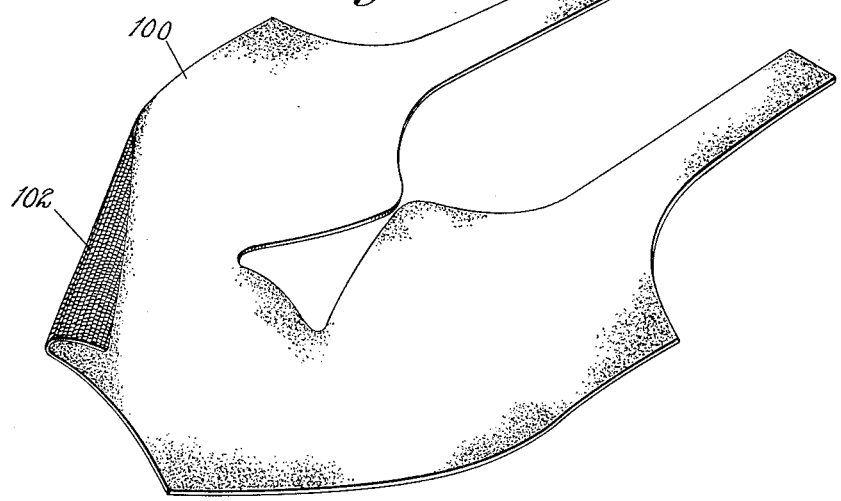
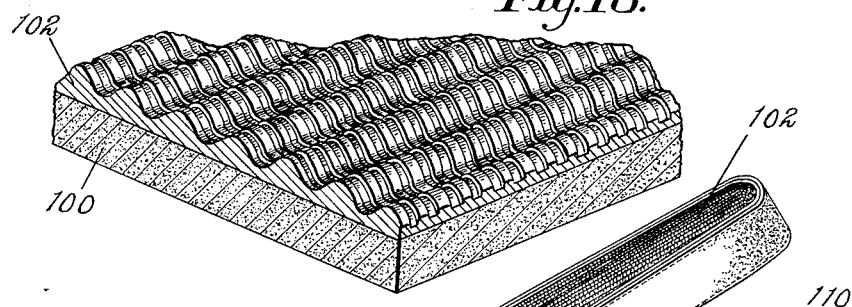
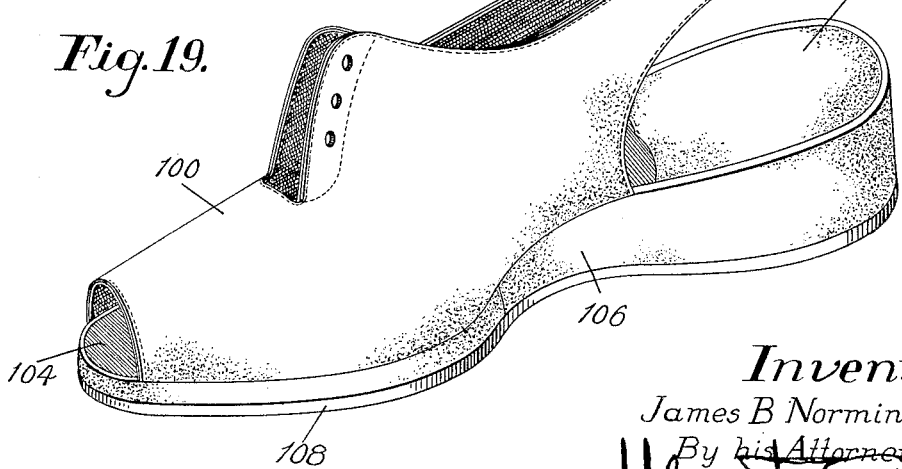
Inventor
James B Normington
By his Attorney Patented Apr. 24, 1951

2,549,985

UNITED STATES PATENT OFFICE 2,549,985

LAMINATED SHOE UPPER

James B. Normington, Beverly, Mass., assignor to United Shoe Machinery Corporation, Flemington, N. J., a corporation of New Jersey Application May 20, 1946, Serial No. 671,009

5 Claims. (Cl. 154—46)

This invention relates to shoes and shoe structures and is illustrated herein by way of example with reference to the manufacture of leather articles such as shoe uppers and the like.

An important object of the present invention is to provide improved articles such as those referred to composed of flexible tanned leather and the flesh surface of which is coated with a plastic material which is integral with said flesh surface and has an exposed surface embossed to simulate material such as fabric or other fibrous material suitable for lining leather.

Another object of the invention is to provide a shoe upper of flexible tanned leather having an integral ornamented coating or lining of plastic material permanently secured to its flesh surface, the plastic material being at least as flexible as the leather itself and being capable of stretching in all directions with the leather a predetermined amount, thereby rendering the stretching action of the leather substantially uniform.

A further object of the invention is to provide a shoe having an upper composed of laminated sheet material having an integral coating or lining of plastic material which will increase its tensile strength, will give improved body or substance to the leather, may be colored to harmonize or contrast with the grain surface of the leather, and may be ornamented by embossing it to simulate a conventional material such as fabric, the embossing providing improved ventilation for the upper and also improving the frictional engagement of the shoe with the foot.

To these ends, the invention provides, in accordance with one aspect, an article of manufacture comprising a shoe having an upper composed of a sheet of flexible tanned leather coated on its flesh surface only with plastic material which is permanently secured to the upper by the adhesive character of the plastic material itself and without the aid of other adhesives to form an integral plastic coating which is all of one piece with the leather, the exposed surface of the plastic material being embossed to simulate a material such as fabric, faille, gabardine, canvas or the like.

As herein illustrated, the leather to be coated preferably consists of a whole skin of flexible tanned leather, such as calf of kid, having a smooth finished outer grain surface and an inner flesh or fibrous surface. The flesh surface of the leather is coated with a layer of plastic material which is permanently attached to said flesh surface by reason of the adhesive qualities of the plastic material itself, thereby providing the skin with a plastic coating or lining which is, in effect, integral with the skin.

In accordance with another aspect of the invention disclosed herein, the pieces which are to form a leather article, which may be a lady's handbag, a toilet case, a shoe upper or other leather article, are preferably cut or dyed out of the skin after the layer of thermoplastic material has been integrally united therewith. The pieces are then embossed on the exposed surface of the plastic material to cause this material to simulate a non-plastic material such, for example, as a fabric such as faille, canvas or gabardine, or thin pliable leather which is also used for coating or lining leather articles.

After being embossed, the pieces may be assembled and secured together by stitching or other means to complete the construction of the article.

The integrally coated leather may be incorporated into a shoe such as a slip-lasted platform shoe, a welt shoe or any other type of shoe requiring a lined upper.

As herein illustrated, the integral plastic material is of a nature to impart increased tensile strength to the leather, thereby rendering it more suitable for the purpose for which it is intended, and the plastic material, by reason of its substantially uniform stretching action in all directions, tends also to equalize the stretching action of the leather in all directions. As stated above, the integral plastic material may, if desired, be colored to harmonize or contrast with the outer or grain surface of the leather, thereby improving the appearance of the laminated sheet material as well as increasing its strength and wearing qualities.

With the above and other objects and aspects in view, the invention will now be described in connection with the accompanying drawings and will thereafter be pointed out in the claims.

In the drawings,

Fig. 1 is a perspective view of a whole skin of flexible tanned leather suitable for use in making leather articles such as handbags, purses, shoe uppers and the like;

Fig. 2 is an enlarged perspective view of a small portion of the skin showing the grain surface of the leather;

Fig. 3 is an enlarged perspective view similar to Fig. 2 showing the flesh surface of the leather skin;

Fig. 4 is a front elevation of a device adapted to apply a sheet of thermoplastic material to the flesh surface of the skin;

Fig. 5 is an enlarged perspective view of a small portion of the skin after the thermoplastic material has been applied thereto;

Fig. 6 is a vertical section of a device adapted to apply plastic material in liquid form to the flesh surface of the leather skin;

Figs. 7, 8, 9 and 10 are perspective views of pieces died out of the plastic coated leather skin for forming a leather article such as a handbag;

Fig. 11 is a front elevation, partly in section, of an apparatus adapted to emboss the exposed surface of the plastic material on leather pieces such as those illustrated in Figs. 7 to 10, inclusive;

Fig. 12 is an enlarged perspective view of a small portion of one of the leather pieces illustrating the embossed surface of the thermoplastic material on the flesh side of the leather;

Fig. 13 is a perspective view of a handbag made from the leather pieces illustrated in Figs. 7 to 10, inclusive, embossed as shown in Fig. 12;

Fig. 14 is a greatly enlarged perspective view of the embossed plastic inner surface of the leather handbag;

Fig. 15 is a perspective view of a toilet case made up of plastic lined leather pieces the inner plastic surfaces of which are embossed with a different pattern than the handbag of Fig. 13;

Fig. 16 is an enlarged perspective view, similar to Fig. 14, of a portion of the leather toilet case of Fig. 15 to illustrate the pattern embossed on the exposed surface of the plastic lining material;

Fig. 17 is a perspective view of a shoe upper of flexible tanned leather having an integral lining of thermoplastic material the inner or exposed surface of which is embossed similar to the articles shown in Figs. 13 and 15;

Fig. 18 is a greatly enlarged perspective view of a small portion of the plastic lined upper of Fig. 17 illustrating the embossed inner surface of the plastic lining material; and, Fig. 19 is a perspective view of a platform shoe utilizing the integral plastic lined upper illustrated in Fig. 17.

In practicing the present invention, a whole skin 20 of flexible tanned leather is provided, the skin preferably being calf or kid which is well adapted for use in the manufacture of flexible leather articles such as handbags, toilet cases, shoe uppers and the like. Such skins are usually about $\frac{1}{16}$ of an inch thick after tanning although they may be somewhat thicker depending upon the type of skin and the purposes for which the leather is to be used. Fig. 2 illustrates on a greatly enlarged scale the grain surface 22 of the tanned leather skin and Fig. 3 illustrates the opposite or flesh surface 24 of the skin.

In accordance with the present invention, the whole skin 20 of flexible tanned leather is coated on its inner or flesh surface with thermoplastic material which will be caused, by reason of the adhesive character of the thermoplastic material itself, to become integrally united with the flesh surface of the leather and thus provide the skin with an integral plastic coating or lining which is permanently secured to said flesh surface to form an integral, laminated plastic and leather sheet. The thermoplastic material, in accordance with the present invention, preferably comprises a vinyl chloride-vinyl acetate copolymer which is preferably applied to the skin in calendered sheet form but which may, if desired, be applied to said flesh surface in a fluid or liquid condition. One example of a thermoplastic material adapted for use in forming an integral lining for the leather skin is a plastic composition made up of 100 parts vinyl chloride-vinyl acetate copolymer 25 to 75 parts of a suitable plasticizer such as dioctyl phthalate, 5 parts titanium dioxide, and such pigments and/or fillers as may be deemed necessary to produce the desired body and color effect in the thermoplastic lining material.

As indicated above, the plastic material may be applied to a whole leather skin either in calendered sheet form or in a liquid condition. In the present case, however, it has been found preferable to apply the thermoplastic material in calendered sheet form, the sheets of thermoplastic material being preferably of substantially uniform thickness as they come from the calendering machine, being colored as desired, and being sufficiently large to cover a whole leather skin such as that illustrated in Fig. 1.

Fig. 4 illustrates one type of apparatus which may be used in applying a calendered sheet of thermoplastic material to the flesh side 24 of the leather skin 20. As illustrated, the applying device consists essentially of a press having a base 26 provided with stationary uprights 28 at the upper ends of which is mounted a metal plate 30 provided with a chamber 32 into which live steam can be introduced to heat the plate to the required temperature. As illustrated in Fig. 4, steam may be introduced into the chamber 32 by means of connections indicated generally at 34, these connections being also adapted to introduce cold water into the chamber to cool the plate after the thermoplastic material has been secured to the leather skin.

The applying device 26 is also provided with a plunger 36 arranged to be moved heightwise by hydraulic or other means and provided at its upper end with a hollow pressing member 38 having a plate 40 thereon adapted to support the leather skin 20 and a calendered sheet of thermoplastic material 42. The hollow pressing member 38 may be heated by steam in the same manner as the plate 30 and connections may be provided, as illustrated in Fig. 4, for introducing cold water into the member 38 to cool the plate 40 after the thermoplastic sheet has been secured to the leather skin. Since the apparatus illustrated in Fig. 4 is of conventional construction well known in the art no further description of this mechanism will be necessary herein. It should be understood, however, that other types of apparatus may be utilized, if desired, for applying the plastic material in calendered sheet form to the leather skin, for example, a pair of heated rolls or similar pressure applying mechanisms.

Fig. 5 illustrates on a greatly enlarged scale a small portion of the leather skin 20 after the calendered sheet of thermoplastic material 42 has been applied to the flesh surface 24 of the skin in the manner described above or in some other suitable manner. As shown in Fig. 5, the leather skin is approximately four or five times thicker than the sheet of thermoplastic lining material which has been integrally secured to the flesh surface of the skin. However, the thickness of the thermoplastic sheet of material may vary according to the purposes for which the leather is to be used, the piece illustrated in Fig. 5 being merely one example of the relative proportions of the combined or laminated leather and plastic sheet. As indicated above, the thermoplastic material may be colored as desired in order to cause it to harmonize or contrast with the grain surface of the leather to which it is applied.

The thermoplastic material 42, as stated above, will adhere permanently to the flesh surface 24 of the leather skin by reason of its own adhesive qualities, the thermoplastic material being usually softened by heat to render it adhesive during its application to the leather in the apparatus 26 and being then cooled quickly in the apparatus to cause the thermoplastic material to harden or set and thus become permanently united or bonded to the flesh surface of the leather, thereby forming an integral plastic layer or coating on the skin. As illustrated in Fig. 5, the layer of thermoplastic material 42 is substantially uniform in thickness throughout the area of the skin and it may be considerably thinner than the skin or it may vary from the example shown in Fig. 5 up to a layer substantially as thick as the leather itself. One proportion of integral leather and plastic sheet that is particularly well adapted for making leather articles such as handbags, purses, shoe uppers and so forth is a skin of flexible leather such as kid or calf about $\frac{1}{16}$" thick having an integral plastic lining on its flesh surface about $\frac{1}{64}$" thick.

The thermoplastic material 42 on the leather skin 20 has been found to be at least as flexible as the leather itself and, in most instances, more flexible than the leather. Furthermore, it does not crack or split under continued flexing or bending action. It increases the tensile strength of the leather anywhere from 20 to 50% and it gives improved body or substance to the leather as a whole. The plastic lining material defined above will stretch in all directions with the leather to a limited degree but it will not ordinarily stretch beyond a predetermined amount in any one direction, so that it renders the leather, which usually stretches more in some directions than in others, substantially uniform in its stretching action. In other words, a skin of flexible leather coated with an integral layer of plastic material will be substantially uniform in its stretching action in all directions or will stretch to a limited degree in all directions, whereas a leather skin without an integral plastic coating is apt to stretch an excessive amount in some directions and much less in other directions.

While the procedure illustrated herein of applying the thermoplastic material in sheet form to the flesh side of the leather skin is the preferred method of coating the skin because it is more convenient and economical and produces substantially uniform results, the plastic material may, if desired, be applied in other ways which would produce satisfactory results. For example, the plastic material may, if desired, be applied to the leather skin in liquid form, as illustrated in Fig. 6, the liquid plastic material being applied by means of an apparatus such as that illustrated in the figure referred to.

The apparatus illustrated in Fig. 6 for applying the liquid plastic material to the leather skin comprises a frame 44 provided with a stationary work support or table 46 and a pair of cooperating rolls 48, 50 driven at equal speeds in opposite directions and arranged to carry the leather along the table from right to left, as viewed in Fig. 6, the upper or applying roll 48 receiving liquid plastic material 52 from a reservoir 54 located above the roll 48 and provided with an opening 56 through which the liquid flows to the roll. A pair of adjustable plates 58, 60 may be provided in a slot in the frame above the applying roll 48 to control the volume of liquid plastic material flowing on to the roll. The numeral 62 designates the layer of plastic material which has been applied to the flesh surface of the leather skin 20, this layer preferably being about ¼ or ⅕ as thick as the skin itself although it could, if desired, be applied considerably thicker by adjusting the plates 58, 60, or by passing the skin through the device several times to apply successive coatings of liquid plastic material. The thermoplastic material will harden or set rapidly when applied in the manner illustrated in Fig. 6 and will adhere permanently to the flesh side of the leather skin by reason of the adhesive character of the plastic material itself without the aid of other adhesives, thereby producing a two-ply laminated layer of sheet material comprising an outer layer of thin flexible tanned leather and an integral inner layer or coating of plastic material of substantially uniform thickness throughout the area of the skin.

After the leather skin 20 has been coated on its flesh surface with a layer of plastic material by either of the methods described above, the skin is ready for use to provide pieces for forming leather articles such as those referred to above. Accordingly, the parts necessary for forming a particular leather article, for example, a lady's handbag or a toilet case, are dyed or otherwise cut out of the plastic lined leather skin, this operation being accomplished in any usual or convenient manner as, for example, with the aid of patterns and a usual cutting tool or by means of a clicking machine provided with the proper dies.

Figs. 7 to 10, inclusive, illustrate pieces died out of the plastic lined skin to produce the lady's handbag shown in Fig. 13, the parts comprising a middle section or partition 64, consisting of two pieces of the leather skin stitched together around their peripheries by a seam 66 with the plastic lined surfaces of the leather in face to face relation so that the outer or grain surfaces 68 will be exposed in the bag, these grain surfaces remaining in their original tanned condition. If desired, the middle section 64 may be provided with a pocket 70 formed of the plastic lined leather and stitched to the section 64 by stitches 71, as illustrated in Fig. 7.

The main portion of the bag is illustrated in Fig. 9, this part, indicated by the numeral 72, being large enough to form a bag of the desired size and shape and having an outer grain surface 74 and an inner surface or lining composed of a uniform layer of thermoplastic material 62 permanently secured to the flesh surface of the leather by the adhesive quality of the thermoplastic material itself. A pair of end pieces 78 and 80 are also provided, these pieces being illustrated respectively in Figs. 8 and 10, and being substantially triangular in shape, thereby completing the parts necessary for making the handbag illustrated in Fig. 13. The parts 78 and 80 have outer surfaces exposing the grain of the leather in its normal tanned condition and inner surfaces composed of integral thermoplastic lining material 62.

Before the parts illustrated in Figs. 7 to 10 are made into the plastic lined leather handbag of Fig. 13, the exposed surface of the thermoplastic material 62 on the flesh side of the parts is embossed to ornament the material and to cause this surface to simulate a material such, for example, as fabric, leather or other fibrous material suitable for coating or lining leather articles. The pieces are preferably ornamented or embossed separately after being dyed out of the skin although this procedure is optional since the plastic surface of the skin may, if desired, be embossed over its entire area before any individual pieces are cut therefrom. Fig. 11 illustrates one method of embossing the exposed surface of the plastic layer 62 of integral lining material to cause it to simulate fabric such, for example, as faille, gabardine, canvas or other fabric materials or, if desired, to resemble leather having a different grain than the outer surface of the leather skin itself.

An apparatus adapted for use in embossing the thermoplastic material is indicated in Fig. 11. A pair of cooperating rolls 82, 84, preferably of metal, are mounted respectively on shafts 83, 85 arranged to rotate at equal speeds in opposite directions, the upper roll 82 being the embossing roll and being provided on its work engaging surface with an impression of the desired ornamental design which is to be impressed into the exposed surface of the plastic material 62. A supporting table 86 is provided adjacent to the rolls for supporting the parts to be operated upon. The pre-cut pieces are fed separately between the rolls to receive the embossing action, the roll 82 being heated by any usual means such as heating units or lamps (not shown) to soften the surface of the thermoplastic material sufficiently to facilitate the embossing operation. The embossing roll 82 is carried by a plunger or piston 88 which may be urged yieldingly toward the supporting roll 84 by any usual mechanism such as a spring or weight to apply sufficient pressure to the piece being embossed to produce satisfactory results. Other means may be used instead of that illustrated in Fig. 11, if desired, to emboss the exposed surface of plastic lining material on the flesh side of the leather piece, since any usual or conventional embossing apparatus capable of producing the desired results would be satisfactory. Fig. 12 illustrates on an enlarged scale a small portion of the piece 72 which is to form part of the handbag of Fig. 13, after the thermoplastic surface 62 on the flesh side of the leather has been ornamented by being embossed to simulate a conventional textile lining material, the embossed surface being indicated by the numeral 90.

The completed lady's handbag is illustrated in Fig. 13 and is indicated generally by the numeral 92, the embossing 90 of the plastic surface 62 showing on a portion of the inside of the cover flap of the handbag. The partition 64 is interposed between the opposite sides of the handbag and, as stated, has exposed surfaces of grain leather rather than plastic material, the partition carrying the pocket 70 which may be lined with the embossed thermoplastic material 62. The end pieces 78 and 80 are secured by stitches to the opposite ends of the bag and a usual clasp or snap fastening is provided for closing the handbag. Since the plastic material 62 is integral with the leather forming the handbag, the coating or lining will not wrinkle or get out of place and, accordingly, will not be so apt to tear or wear out too quickly. The embossing 90 on the plastic lining material, as illustrated on a greatly enlarged scale in Fig. 14, may be of a pleasing ornamental design to make the handbag attractive and the plastic material is preferably colored to contrast or harmonize with the leather forming the outer surface of the handbag. Since plastic material of the nature referred to is at least as flexible as the leather forming the handbag, it will not chip or crack during the use of the bag or render the latter stiff or ungainly to handle. Moreover, since the thermoplastic coating material increases the tensile strength of the leather from 20 to 50%, there is little danger of the leather splitting or tearing during the use of the article.

Fig. 15 illustrates a toilet case made of thin flexible tanned leather such as calf or kid having an integral thermoplastic coating material secured to its flesh surface by the adhesive character of the plastic material itself, the plastic material being ornamented by being embossed on its exposed surface to simulate a material such as leather or fabric, for example, faille, gabardine, or other materials suitable for use as linings for leather articles. The toilet case is indicated generally by the numeral 94 and the thermoplastic lining material by the numeral 96, the ornamental embossing on the exposed surface of the plastic lining being designated by the numeral 98. As explained above, the parts forming the toilet case are preferably cut out separately from the tanned leather skin to which the thermoplastic material, either in sheet form or as a liquid has been applied, and the pieces are then embossed separately to give the integral plastic material the appearance of a conventional loose non-plastic lining material. The pieces are then assembled and secured together, as illustrated in Fig. 15, to complete the article.

Fig. 16 illustrates, on a greatly enlarged scale, a small portion of the plastic lined leather forming the toilet case of Fig. 15, this figure disclosing a design on the embossed surface of the plastic material different from that on the handbag 92 and also illustrating the relative thicknesses of the leather and plastic lining. As stated above, the plastic lining 96 may be relatively thin compared to the thickness of the leather forming the article illustrated in Fig. 16 or, if desired, the plastic material may be considerably thicker than shown in Fig. 16 to provide more body or substance to the multi-ply or laminated sheet material forming the article.

As indicated above, the thermoplastic coated leather skin may also be used for forming shoe uppers, as illustrated at 100 in Fig. 17, the upper 100 being a one-piece upper adapted for use in a platform shoe having an open toe and heel. The upper will have its inner or flesh surface coated with a thermoplastic lining 102 which is integral with the leather and is embossed on its exposed surface to simulate a conventional lining, in the present case, fabric such as gabardine. Fig. 18 shows a portion of the leather upper on a greatly magnified scale to illustrate the relative thicknesses of the leather layer of the upper and its integral thermoplastic lining 102 and also to show the pattern or design of the embossing which causes the lining to resemble gabardine. The embossing extends at least half way through the thickness of the plastic layer 102 and produces a design of alternate ridges and valleys of a width less than the thickness of the plastic layer extending between the edges of the upper, these ridges and valleys serving to improve ventilation in the shoe illustrated in Fig. 19 by decreasing the area of the plastic surface which engages the foot and by providing ventilating passages extending from the edges of the upper into the shoe. They also serve to prevent the shoe from slipping on the foot by increasing the frictional engagement of the shoe with the foot.

The upper 100 is preferably died out of a whole leather skin into the shape illustrated in Fig. 17 after the thermoplastic material 102 has been applied but before this material has been embossed, the upper being presented to an embossing device, such as that illustrated in Fig. 11, in a flat condition to produce the effect shown in Figs. 17 and 18. The upper may be utilized in constructing a platform shoe having an open toe and heel such as that illustrated in Fig. 19, the lower margin of the upper being secured off a last by stitches to a flexible sock lining 104 and a wrapper strip 106 in the usual manner, the upper having been previously completed by stitching the two strap portions together at the heel end.

After the upper 100 has been assembled and secured by stitches to the sock lining and wrapper strip, the shoe is slip-lasted in the customary manner by inserting a last therein and a wedge heel and platform sole are attached, after which the wrapper strip is wiped over the edge and bottom surface of the platform sole and secured thereto usually by cement. The shoe may then be completed by attaching an out-sole 108 to the inturned portion of the wrapper strip in accordance with the conventional method of manufacturing slip-lasted platform shoes. If desired, a slip sole may be secured to the exposed surface of the flexible insole or sock lining or, as illustrated in Fig. 19, a heel pad 110 may be cemented to the heel portion of the sock lining to give the shoe a finished appearance. As explained above, the integral thermoplastic lining 102 is preferably of a color which contrasts or harmonizes with the grain surface of the leather forming the upper. The thermoplastic lining material is embossed to simulate fabric, leather or other lining material so that the finished shoe has the appearance of a conventional slip-lasted platform shoe provided with a usual fabric or leather lining. The embossing illustrated in Figs. 18 and 19, as stated above, improves ventilation in the shoe by decreasing the area of the plastic surface engaging the foot and it also tends to prevent the shoe from slipping on the foot by increasing the frictional engagement of the shoe with the foot. Since the plastic lining 102 of the shoe is integral with the leather forming the upper, it not only increases the tensile strength of the upper, as pointed out above, but it causes the upper to fit the last closely without forming creases or wrinkles in the lining material, thereby enhancing the appearance of the shoe. Since the plastic lining material is at least as flexible as the leather forming the upper, the shoe will fit the foot accurately and be comfortable during wear not only because of the absence of wrinkles in the lining but also because of the ability of the integral lining material to flex or bend with the leather of the upper during the wearing of the shoe, particularly at the forepart. If desired the leather forming the wrapper strip 106 and the material forming the sock lining 104, in cases where leather is used, may be provided from the plastic coated leather skin, although such construction is optional because an integral lining on these parts would not show in the finished shoe and would be utilized merely because of the flexible quality of the lining material and because of the fact that the plastic lining may also be used as an adhesive for securing the platform sole to the sock lining and for securing the wrapper strip to the platform sole. It should be pointed out that, in accordance with the present method of making leather articles, including shoe uppers, provided with integral thermoplastic linings, no particular attention need be given to the direction of the stretch of the upper because the thermoplastic lining material will, as stated, stretch a predetermined amount in all directions. Moreover, there is substantially no waste involved in utilizing a lining of this kind because any excess portions of the calendered sheet of thermoplastic material applied to the skin may be trimmed off even with the edges of the skin after the plastic material has been secured thereto, and the portions trimmed off may be utilized in forming another calendered sheet of thermoplastic lining material.

Having thus described my invention what I claim as new and desire to secure by Letters Patent of the United States is:

1. As an article of manufacture, a shoe upper comprising a laminated sheet of flexible tanned leather having a finished grain-leather surface on its outer side and a plastic surface on its inner side, said plastic surface being composed of a relatively thin layer of a vinyl chloride-vinyl acetate copolymer permanently bonded to the unfinished flesh surface of the leather sheet by the adhesive character of the plastic material itself, and said plastic surface being embossed at least half way through the thickness of the plastic layer to produce an ornamental design thereon which extends between the edges of the upper and simulates fabric material but is stronger and less stretchable than fabric material, said embossing serving to improve ventilation by relieving and decreasing the area of the plastic surface thereof which engages the foot.

2. As an article of manufacture, a shoe upper comprising a laminated sheet of flexible tanned leather having a finished grain-leather surface on its outer side and a plastic surface on its inner side, said plastic surface being composed of a relatively thin layer of a vinyl chloride-vinyl acetate copolymer permanently bonded to the unfinished flesh surface of the leather sheet by the adhesive character of the plastic material itself, and said plastic surface being embossed at least half way through the thickness of the plastic layer to produce a design of alternate ridges and valleys extending between edges of the upper to improve ventilation by decreasing the area of the plastic surface of the upper which engages the foot and providing ventilating passages extending from the edges of the upper.

3. As an article of manufacture, a shoe upper comprising a laminated sheet of flexible tanned leather having a finished grain-leather surface on its outer side and a plastic surface on its inner side, said plastic surface being composed of a relatively thin layer of a vinyl chloride-vinyl acetate copolymer permanently bonded to the unfinished flesh surface of the leather sheet by the adhesive character of the plastic material itself, and said plastic surface being embossed at least half way through the thickness of the plastic layer to produce a design of alternate ridges and valleys of a width less than the thickness of the plastic layer and extending between edges of the upper to improve ventilation by decreasing the area of the plastic surface of the upper which engages the foot and providing ventilating passages extending from the edges of the upper.

4. As an article of manufacture, a shoe upper comprising a laminated sheet of flexible tanned leather having a finished grain-leather surface on its outer side and a plastic surface on its inner side, said plastic surface being composed of a relatively thin layer of a vinyl chloride-vinyl acetate copolymer permanently bonded to the unfinished flesh surface of the leather sheet by the adhesive character of the plastic material itself, and said plastic surface being embossed at least half way through the thickness of the plastic layer to produce a design of alternate ridges and valleys extending in one direction and alternate narrower ridges and narrower valleys extending in another direction which design simulates fabric material but is stronger and less stretchable than fabric material, said embossing serving to improve vetilation by relieving and decreasing the area of the plastic surface of the upper which engages the foot, and serving also to prevent slipping by increasing the frictional engagement of the upper with the foot.

5. As an article of manufacture, a shoe upper comprising a laminated sheet of flexible tanned leather having a finished grain-leather surface on its outer side and a plastic surface on its inner side, said plastic surface being composed of a relatively thin layer of a vinyl chloride-vinyl acetate copolymer permanently bonded to the unfinished flesh surface of the leather sheet by the adhesive character of the plastic material itself, and said plastic surface being embossed at least half way through the thickness of the plastic layer to produce a design of alternate ridges and valleys of a width less than the thickness of the plastic layer extending in one direction and alternate narrower ridges and narrower valleys extending in another direction which design simulates fabric material but is stronger and less stretchable than fabric material, said embossing serving to improve ventilation by relieving and decreasing the area of the plastic surface of the upper which engages the foot, and serving also to prevent slipping by increasing the frictional engagement of the upper with the foot.

JAMES B. NORMINGTON.

REFERENCES CITED

The following references are of record in the file of this patent:

UNITED STATES PATENTS

| Number | Name | Date |
|---|---|---|
| 128,055 | McIlhenney | June 18, 1872 |
| 795,075 | Steinharter | July 18, 1905 |
| 1,369,240 | Hahn | Feb. 22, 1921 |
| 1,588,173 | Cummings | June 8, 1926 |
| 1,773,089 | Ayres | Aug. 19, 1930 |
| 1,846,630 | Close | Feb. 23, 1932 |
| 2,029,361 | Diller | Feb. 4, 1936 |
| 2,033,855 | Sloan | Mar. 10, 1936 |
| 2,046,000 | Sart | June 30, 1936 |
| 2,149,030 | Moore | Feb. 28, 1939 |
| 2,153,832 | Gutwein | Apr. 11, 1939 |
| 2,253,598 | Africa | Aug. 26, 1941 |
| 2,294,069 | Campbell | Aug. 25, 1942 |
| 2,302,167 | Austin | Nov. 17, 1942 |
| 2,361,296 | Kennedy | Oct. 24, 1944 |
| 2,373,285 | Baer | Apr. 10, 1945 |
| 2,394,900 | Clisby | Feb. 12, 1946 |
| 2,429,591 | Bazzoni | Oct. 28, 1947 |

FOREIGN PATENTS

| Number | Country | Date |
|---|---|---|
| 330,755 | France | Aug. 7, 1903 |
| 473,657 | Great Britain | Oct. 15, 1931 |
| 468,430 | Great Britain | July 5, 1937 |